3,433,787
6-SPIROOXIRANEPROGESTERONES

James F. Kerwin, Broomall, Pa., assignor to Smith Kline & French Laboratories, Philadelphia, Pa., a corporation of Pennsylvania
No Drawing. Filed Oct. 21, 1966, Ser. No. 588,336
U.S. Cl. 260—239.55                  8 Claims
Int. Cl. C07c *173/00, 169/34*

This invention relates to new steroid compounds having at the 6-position thereof a spirooxirane ring. In particular, the invention relates to 6-spirooxiraneprogesterones having progestational and antiandrogenic activities.

The compounds of the invention are represented by the following structural formula:

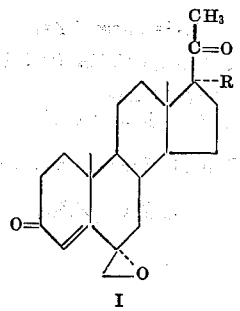

I where R is hydrogen, hydroxy, or lower alkanoyloxy; or a $\Delta^1$ derivative thereof.

The term "lower alkanoyloxy" is intended to refer to those alkanoyloxy groups having up to about 8 carbon atoms therein, particularly formyloxy, acetoxy, propionyloxy, butyryloxy, valeryloxy, and caproyloxy.

The compounds of the invention are prepared by epoxidizing the corresponding known 6-methylene steroid with a reagent such as m-chloroperbenzoic acid. When using the preferred mode of preparation, the steroid and an excess of the peracid are allowed to react in a solvent such as methylene chloride or chloroform for two to four days. The reaction is conducted at room temperature or in the refrigerator. The mixture is then washed with weak base and the product purified by chromatography over alumina. Other peracids such as perphthalic and chloroperbenzoic acids may also be used for the epoxidation.

When a 17α-lower alkanoyloxy product is desired, the starting material should possess such a substituent. The 17α-hydroxy product is obtained by saponification of a 17α-alkanoyloxy compound with weak base. The $\Delta^1$ compounds are prepared by dehydrogenation of the appropriate 1,2-saturated compound with 2,3-dichloro-5,6-dicyanobenzoquinone.

The compounds of the invention, being progestational agents, are useful in those instances where an increased progestational effect is required, such as threatened or habitual abortion, infertility, secondary amenorrhea, and functional uterine bleeding. They are formulated for oral use into tablets by combination with standard pharmaceutical excipients in the conventional manner. A tablet may contain 2.5-25 mg. The principal compound of the invention, 17α-acetoxy-6-spirooxiraneprogesterone, has been found to possess progestational activity greater than that of progesterone at oral doses of 2-5 mg./kg. in rabbits. This compound also shows anti-androgenic activity in rats at subcutaneous doses of 100 mg./kg.

In Formula I and throughout this disclosure, the 6-spirooxirane ring is considered to be so disposed that the methylene group of the ring has the β-configuration and the oxygen atom has the α-configuration. This disposition of the oxirane is believed correct, but it is to be understood that the invention consists of the compounds which are actually obtained by the disclosed procedures, whatever the configuration of the spirooxirane ring.

The following examples are intended to illustrate the preparation of the compounds of the invention, but are not to be construed as limiting the scope thereof.

EXAMPLE 1

17α-acetoxy-6-spirooxiraneprogesterone

A solution of 15.0 g. (0.039 mole) of 17α-acetoxy-6-methylene progesterone, 24.1 g. (0.12 mole) of m-chloroperbenzoic acid and 400 ml. of methylene chloride is placed in a refrigerator for 72 hours. Completion of the reaction is evidenced by the disappearance of the 6-methylene starting material when the mixture is subjected to thin layer chromatography (1:1 cyclohexane-ethyl acetate on $SiO_2$). The suspension is extracted with $NaHCO_3$ solution and then water, dried and evaporated to a syrup. The syrup is dissolved in the minimum amount of benzene and added to a column packed with 600 g. of Woelm (Act. III) alumina. Elution with benzene and increasing concentrations of methylene chloride gives the title product. Crystallization from methanol gives the pure product, M.P. 269-271°

$\lambda_{max.}^{EtOH}$ 240 mμ ($\epsilon$=16,100)

$[\alpha]_D^{25}$=+104.6° (c.=0.65 in $CHCl_3$).

EXAMPLE 2

17α-hydroxy-6-spirooxiraneprogesterone

A solution of 2.0 g. of the acetate of Example 1 in 120 ml. of methanol is heated to reflux and a solution of 0.64 g. of KOH in 20 ml. of water is added over a 30 minute period. After refluxing for 2 hours, the solution is cooled, poured in 10 volumes of water, and the mixture extracted with methylene chloride. The organic extracts are dried and evaporated to give the title product.

EXAMPLE 3

17α-acetoxy-6-spirooxiranepregna-1,4-diene-3,20-dione

A solution of 1.98 g. of the acetate of Example 1 and 1.5 g. of 2,3-dichloro-5,6-dicyanobenzoquinone in 50 ml. of dioxane is refluxed for ca. 18 hours. The solution is filtered, the filtrate evaporated to dryness, and the residue taken up in ethyl acetate. The solution is washed with water and then dried and evaporated to give the title diene.

Saponification with base as described in Example 2 gives the 17α-hydroxy diene.

EXAMPLE 4

When the epoxidation reaction of Example 1 is applied to the equivalent quantities of the following 6-methylene starting materials, the corresponding listed products are obtained.

Starting material: 6-methyleneprogesterone
Product: 6-spirooxiraneprogesterone

Starting material: 6-methylene-17α-propionyloxyprogesterone
Product: 17α-propionyloxy-6-spirooxiraneprogesterone Starting material: 17α-caproyloxy-6-methyleneprogesterone
Product: 17α-caproyloxy-6-spirooxiraneprogesterone Starting material: 6-methylene-17α-valeryloxyprogesterone
Product: 17α-valeryloxy-6-spirooxiraneprogesterone

EXAMPLE 5

When the dehydrogenation reaction of Example 3 is applied to equivalent quantities of the products of Example 4, the following products are obtained:

6-spirooxiranepregna-1,4-diene-3,20-dione,
17α-propionyloxy-6-spirooxiranepregna-1,4-diene-3,20-dione,
17α-caproyloxy-6-spirooxiranepregna-1,4-diene-3,20-dione,
17α-valeryloxy-6-spirooxiranepregna-1,4-diene-3,20-dione.

I claim:
1. A compound of the formula

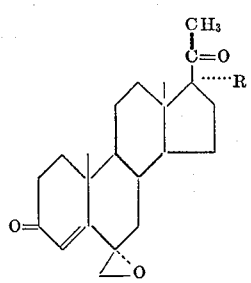

or a $\Delta^1$ derivative thereof, where R is hydrogen, hydroxy, or lower alkanoyloxy of 1-8 carbon atoms.

2. A compound as claimed in claim 1, where the 1,2-bond is saturated.
3. A compound as claimed in claim 2, where R is acetoxy, being the compound 17α-acetoxy-6-spirooxiraneprogesterone.
4. A compound as claimed in claim 2, where R is propionyloxy, being the compound 17α-propionyloxy-6-spirooxiraneprogesterone.
5. A compound as claimed in claim 2, where R is hydroxy, being the compound 17α-hydroxy-6-spirooxiraneprogesterone.
6. A compound as claimed in claim 2, where R is hydrogen, being the compound 6-spirooxiraneprogesterone.
7. A compound as claimed in claim 1, having a $\Delta^1$ double bond.
8. A compound as claimed in claim 7, where R is acetoxy, being the compound 17α-acetoxy-6-spirooxiranepregna-1,4-diene-3,20-dione.

References Cited
UNITED STATES PATENTS
3,318,873  5/1967  Kerwin.
3,328,431  6/1967  Bowers et al.

HENRY A. FRENCH, *Primary Examiner.*

U.S. Cl. X.R.
260—999